Dec. 5, 1967  P. B. FONDEN  3,356,040
DEVICE FOR CONVEYOR SYSTEMS
Filed June 1, 1965
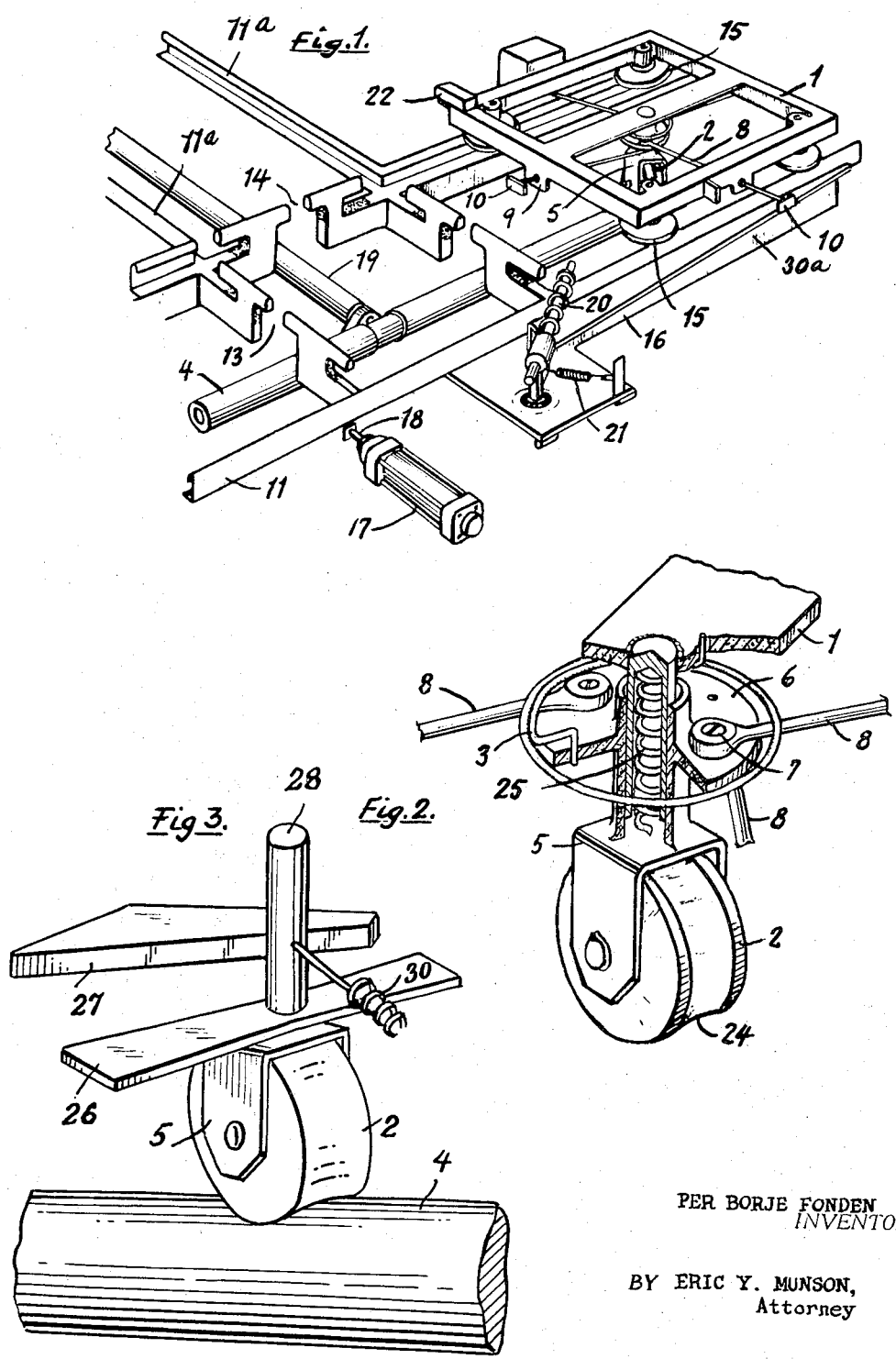
PER BORJE FONDEN
INVENTOR.
BY ERIC Y. MUNSON,
Attorney 3,356,040
DEVICE FOR CONVEYOR SYSTEMS
Per Börje Fondén, Linkoping, Sweden, assignor to Borgs
Fabriks AB, Norrkoping, Sweden
Filed June 1, 1965, Ser. No. 460,375
3 Claims. (Cl. 104—130)

ABSTRACT OF THE DISCLOSURE

A driving means for use in conveyor systems in which a rotating shaft is employed for the driving of trucks that move on tracks. The driven truck carries a driving wheel mounted in a fork and arranged so that the driving wheel is normally positioned at a 45 degree angle relatively to the longitudinal axis of the drive shaft. The wheel is spring-urged toward the drive shaft and it is mounted to rotate in the fork which is adapted for swivelling movement by means of a spindle extending upwardly from the upper cross piece of the fork that is located directly above the center of the drive wheel and also above the longitudinal center line of the drive shaft. The invention further contemplates means for automatically shifting the angularity of the drive wheel relatively to the drive shaft to thereby change the speed of travel of the truck.

---

This invention comprises a device for conveyor systems used to transport trucks along definite pathways such as tracks or the like and on which the trucks are propelled by means of frictional contact between a rotating drive shaft arranged parallel to the pathway, and by one or more drive wheels mounted on the truck and which are positioned obliquely relative to the drive shaft.

The driving force obtained is due to the angular difference between the rotation vectors of the drive shaft and the drive wheel.

It is highly desirable, particularly in more complicated conveyor systems, to be able to regulate the speed at which the trucks are driven forwardly. This is particularly true for track systems which are laid out with branch tracks extending off to the side, at right angles for example, to form an L or a T crossing. If, for example, a straight section of tracks is arranged so that trucks can be switched to one side, it is desirable that trucks which are to proceed straight ahead and are not to be switched aside to be able to continue with undiminished speed, while trucks which are to be switched onto a side track should gradually lose speed as they enter the side track.

Moreover it is desirable that the driving force be reduced to zero, or nearly zero, if the trucks tend to strike some obstruction, such as for example, when one truck catches up with another and comes into contact with it.

It is an object of the invention to provide a solution to the problems which are connected with an arrangement of this kind and it is characterized chiefly in that the drive wheel is mounted so that it can rotate about a shaft which is essentially aligned radially relative to the drive shaft and that the swivel position of the wheel is adjustable by means of one or more sensing devices such as push rods which swivel the drive wheel relative to the drive shaft if the truck, as it moves along the track system, brings one of the sensing devices into contact with external objects.

The invention is illustrated in the attached drawing in which

FIG. 1 is a perspective view of a track system and truck in which the present invention is embodied;

FIG. 2 is a perspective view showing a part of the truck as designated by the arrow and drawn to a larger scale, and FIG. 3 shows a modified construction.

At the center of every truck 1 is a swivelling drive wheel 2 which is acted upon by a torsional spring 3 so that it tends to assume a 45 degree angle relative to a rotating drive shaft 4 mounted horizontally beneath the track, this being the normal angle assumed by the drive wheel for drive purposes from the shaft 4.

The drive wheel 2 is carried in a forked frame 5 provided with a flange 6 on its shaft or spindle. On said flange 6, at a distance from the center, are arranged bearings 7 for push-rods 8 which extend through holes in lugs 9 provided on the truck and terminate in bumpers 10. The position of the bearings 7 is such that, regardless of the direction in which the truck moves, the wheel 2 will swivel with a rotation vector that is parallel to that of the drive shaft, that is, to a position at right angles to it, if the forward bumper strikes some obstruction, for example, another truck up ahead on the track. One end of a torsional spring 3 is attached to the flange 6 and the other end is attached to the truck.

The truck runs on the rails 11 and when switched, on the side rails 11a. At the switch, recesses 13 and 14 are provided for the wheels and the flange 6 on the drive wheel 2. In the case illustrated, the truck wheels 15 are shown as being tapered with vertical axles, since this enables the truck to change its direction by 90 degrees without mechanical change or swivelling. There are other possibilities which can be used, such as by providing a small turntable at the switch for every wheel and having them turned 90 degrees by an external force as the truck is turned.

The push rods 8 directed to the sides can be actuated by a guide 16, positioned parallel to the direction of the trackway and with a guide surface 30a positioned obliquely relatively to the track, along which the inside surfaces of the bumpers 10 are adapted to run. This provides a pull on the push rod 8 and it thus causes swivelling movement of the drive wheel 2 so that it assumes such a position in respect to the drive shaft that the speed of the truck is materially reduced. In this manner the truck, when it has reached the switch, has had its speed reduced considerably. When the truck has passed fully onto the switch, it can be acted on for example, by a hydraulic or pneumatic cylinder 17 with a piston rod 18 which pushes the truck far enough onto the side track 11a so that the drive wheel 2 comes into contact with the side track drive shaft 19.

Other arrangements for pushing the truck into contact with the side track drive shaft are possible. For example, by using an oblique, spring-loaded, telescopic and swivelling push rod 20 compressed against a spring and simultaneously swivelled by the motion of the truck. When the truck has reached the switch and the truck is thus free to move at right angles to its previous movement, the compressed spring expands and drives the truck onto the side track 11a. The spring 21 then re-swivels the push rod 20 back into position to engage the next truck.

The devices herein described can be used together with addressing devices which, in principle, are of known types. Thus, every truck can be provided with indicating devices comprising movable blocks 22. These blocks can represent a binary number system, and the preset numerical value used in this system is sensed by a sensing station located before the switch, which can operate electrically or mechanically, for example. If the preset numerical value is such that the truck is to be switched, a mechanical or electrical arrangement which is in and of itself known, actuates both guide 16 and the pushed device 17 or 20 so that they engage the proper parts on the truck. If the preset numerical value indicates that the truck is to continue straight ahead, the guide 16 and the pusher device remain in such positions that the truck will pass without contacting them.

The drive wheel 2 is so designed that its non-castoring relative to the drive shaft which means that the driving forces on the truck have no effect on the angle between the drive wheel and the drive shaft. This means that the required swivelling forces on the drive wheel can be kept low relative to the propulsive force acting on the truck and thus part of the propulsive force can easily be used to automatically reset the drive wheel angle.

Since the drive wheel 2 in this embodiment of the invention is non-castoring it is suitable to supplement the arrangement with some device which, when acted upon by the torsional spring 3 during retardation, stopping or acceleration, provides a relatively slow outward swivelling to the 45 degree position and thus a gentle retardation or acceleration of the truck. This can be accomplished, for example, by permitting the swivelling of the drive wheel to work against a dampening device, which in and of itself is known, or by providing the drive wheel with a suitably-sized groove 24 at the center of its tread so that the wheel contacts the drive shaft at two separate points. The drive wheel is kept pressed against the drive shaft by the spring 25.

In FIG. 3 is shown an embodiment wherein the frame 5 is provided with laterally projecting wings 26 extending radially from the spindle 28. Said wings contact a cam during travel of the truck, said cam being indicated at 27 and having an obliquely located edge which when engaging with the wings rotates the wheel 2 around its axis 28 and in relation to the shaft 4. The cam 27 can be fixed or it can be made capable of elevating or lowering movement so that it can be removed from an operative positon when certain trucks are not to be switched.

It is possible to control the acceleration of the truck in the same way as when controlling its retardation, through contact between cams and the elements which control the angle of the drive wheel 2 relative to the drive shaft 4. This effect is obtained if the truck moves in the opposite direction to that herein mentioned.

Having thus described embodiments of the invention it is obvious that the same is not to be restricted thereto, but is broad enough to cover all structures coming within the scope of the annexed claims.

What I claim is:

1. A device for a conveyor system used to transport trucks along definite pathways such as tracks and on which the trucks are propelled by frictional contact between a rotating shaft arranged parallel to the pathway and with one or more drive wheels carried by the truck and which drive wheels are positioned obliquely to the drive shaft, the improvements consisting in the drive wheel being mounted on an axle and adapted to swivel about a shaft, the shaft being disposed directly over the axle and above the longitudinal axis of the drive shaft, a spring holding the drive wheel at an angle of approximately 45 degrees against the drive shaft and correcting deviations from that angle by moving the drive whel back to its position at said angle, and push rods by which the drive wheel is swivelled in relation to the drive shaft when the truck, as it moves along the tracks, comes into contact with an object.

2. A device according to claim 1, characterized in that the drive wheel is kept pressed against the drive shaft by means of a spring.

3. A device for a conveyor system in which a truck is moved along tracks by the contact of a rotating drive shaft with a drive wheel carried by the truck, a fork carrying the wheel, the fork having a top cross piece located directly over the drive wheel, a shaft extending upwardly from the cross piece of the fork, said shaft being located at a point above the center of the drive wheel and above the longitudinal axis of the drive shaft, said upwardly-extending shaft constituting a swivel mounting for the fork, a plurality of sensing fingers extending from the fork, and cam means arranged along the tracks for contact with at least one of the fingers adjacent to a switching point on the tracks and which cam means is effective on contact with one of the fingers to swivel the fork and cause a change in the angular position of the wheel relative to the drive shaft and result in a change of speed of the truck.

References Cited

UNITED STATES PATENTS

| 418,856 | 1/1890 | Storey | 104—166 |
| 993,261 | 5/1911 | Lowell | 246—206 X |
| 1,122,643 | 12/1914 | Rice | 246—182 |
| 1,171,112 | 2/1916 | Frees | 246—182 |
| 2,997,003 | 8/1964 | Thompson | 104—93 |
| 3,118,393 | 1/1964 | Ohlin | 104—166 |
| 3,164,104 | 1/1965 | Hunt | 104—166 |

FOREIGN PATENTS

| 8,954 | 8/1889 | Great Britain. |
| 8,955 | 6/1889 | Great Britain. |
| 4,820 | 5/1890 | Great Britain. |

ARTHUR L. LA POINT, *Primary Examiner.*

J. E. BABER, D. F. WORTH, *Assistant Examiners.*